United States Patent [19]

Kitajima

[11] Patent Number: 5,621,593

[45] Date of Patent: Apr. 15, 1997

[54] MAGNETORESISTIVE HEAD AND METHOD OF FABRICATING THE SAME

[75] Inventor: Masamitsu Kitajima, Kanagawa, Japan

[73] Assignee: Fujitsu Limited, Kawasaki, Japan

[21] Appl. No.: 495,200

[22] Filed: Jun. 27, 1995

[30] Foreign Application Priority Data

Sep. 8, 1994 [JP] Japan .................................. 6-214844

[51] Int. Cl.$^6$ ...................................................... G11B 5/33
[52] U.S. Cl. ............................................................ 360/113
[58] Field of Search ........................... 360/113; 338/32 R

[56] References Cited

U.S. PATENT DOCUMENTS 5,247,413  9/1993  Shibata et al. ........................ 360/113
5,280,401  1/1994  Inomata ................................ 360/97.01
5,365,212  11/1994  Saito et al. ........................... 338/32 R

FOREIGN PATENT DOCUMENTS

61-241993  10/1986  Japan .
5182147    7/1993   Japan .
5217123    8/1993   Japan .
5325138    12/1993  Japan .

Primary Examiner—John H. Wolff
Attorney, Agent, or Firm—Greer, Burns & Crain

[57] ABSTRACT

The present invention relates a magnetoresistive head of an MR device. The magnetoresistive head comprises a nonmagnetic metal layer formed on an insulating layer, and a magnetic layer formed on the nonmagnetic metal layer.

8 Claims, 7 Drawing Sheets

<sample A>

<sample B>

MAGNETORESISTIVE HEAD AND METHOD OF FABRICATING THE SAME

BACKGROUND OF THE INVENTION

1. Field of the Invention

The present invention relates to a magnetoresistive head and a method of fabricating the same and, more particularly, to a magnetoresistive head used for reading information signals recorded on a magnetic recording medium in a hard disk device, a magnetic card device and a magnetic tape device etc. as a high density recording apparatus empolying a magnetic recording scheme and a method of fabricating the same.

2. Description of the Prior Art

In order to put a magnetic head employing magnetoresistance effect to practical use, a magnetoresistance layer (referred to as an MR layer hereinafter) must respond linearly to a magnetic signal field generated by a recording medium in a change of electric resistance.

In order to attain the linear response of the MR layer, a magnetic bias should be applied to the MR layer. Such magnetic bias is called as a linearizing bias.

Several approaches are known as means for applying the linearizing bias. As one method of the linearizing bias, a soft magnetic layer is arranged on the MR layer through a nonmagnetic metal layer. This method has advantages such as a good bias efficiency and a small shift in a bias point due to the sense current.

A conventional MR device employing such a structure is disclosed in Patent Application Publications (KOKAIs) 5-217123, 5-325138 and 5-182147, for example. The conventional MR device has a constitution shown in FIG. 1A, for instance.

Figure 1A:
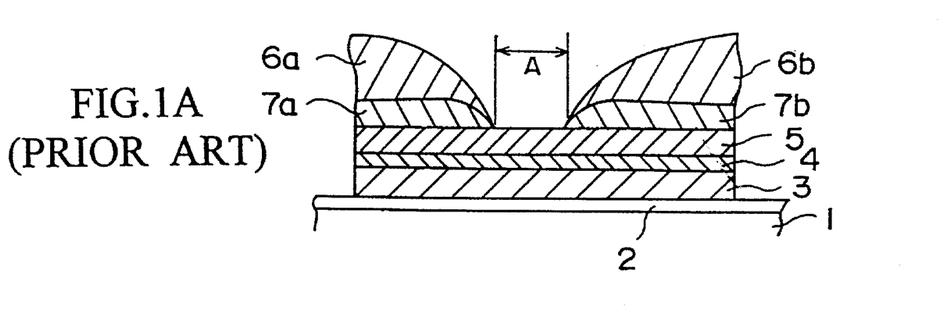
FIG. 1A is a sectional view showing an example of a conventional MR device.

Referring to FIG. 1A, an insulating layer 2 is formed on a substrate 1 made of a magnetic shield material. A soft magnetic layer 3, a nonmagnetic metal layer 4, and an MR layer 5 are formed on the insulating layer 2 in that order. A pair of connecting conductor leads 6a, 6b are formed on both ends of the MR layer 5 so as to put a sense area A therebetween. Antiferromagnetic layers 7a, 7b are formed between the connecting conductor leads 6a, 6b and the MR layer 5. The MR layer 5 is magnetized by an exchange interaction between the MR layer 5 and the antiferromagnetic layers 7a, 7b so as to be directed from one conductor leads 6a to the other conductor leads 6b. In addition, an insulating layer and a magnetic shield layer, both not especially shown in FIG. 1A, are formed on them.

Figure 1B:
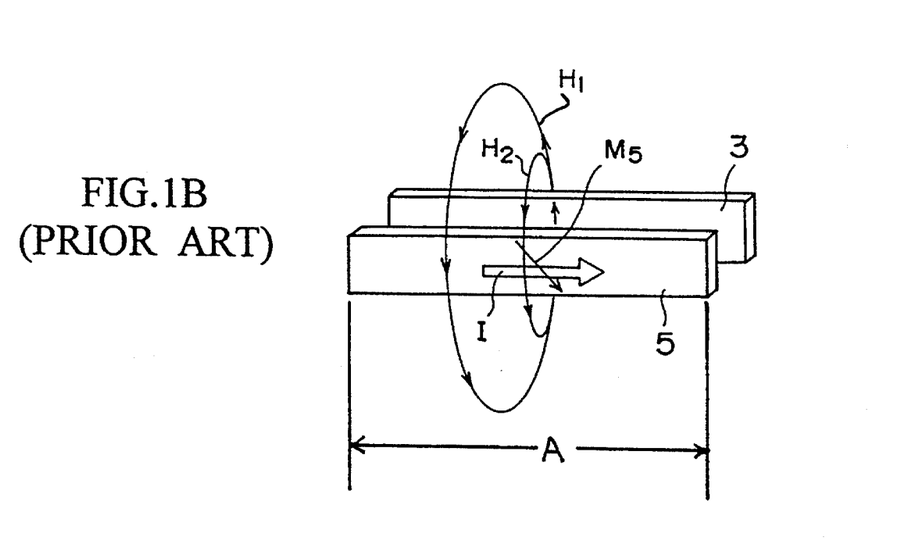
FIG. 1B is a perspective view showing a magnetic bias field of the conventional MR device in FIG. 1A.
Figure 1C:
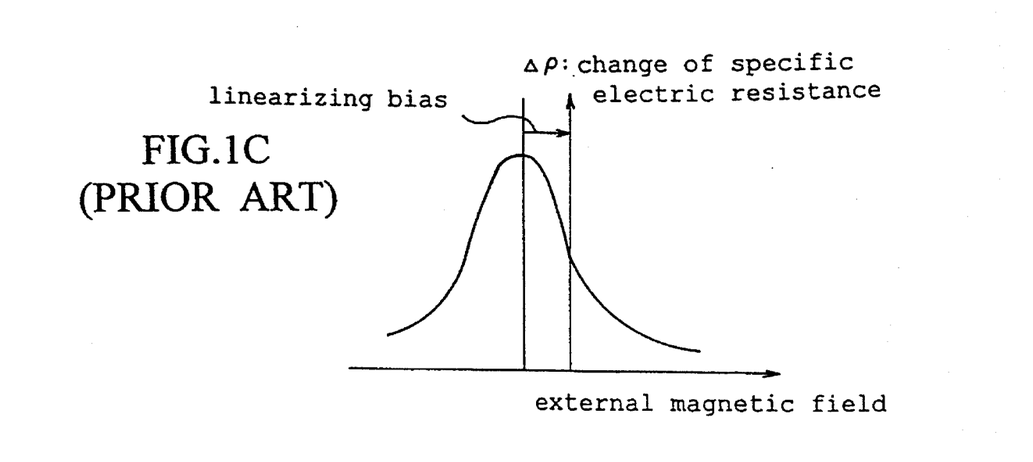
FIG. 1C is a characteristic curve showing a relationship between a resistivity change and an external magnetic field of the conventional MR device in FIG. 1A.

In the above MR device, as shown in FIG. 1B, by causing a sense current I to flow into the area A, a magnetic field H1 is generated around the MR layer 5. The soft magnetic layer 3 is magnetized because of the magnetic field H1. Thus, a magnetic bias field H2 is generated by the magnetization of the soft magnetic layer 3 in the direction perpendicular to the direction of initial magnetization M5 of the MR layer 5. Then, a direction of the magnetization M5 of the MR layer 5 is changed by the magnetic bias field H2 of the soft magnetic layer 3. As a result, a characteristic curve of electric resistance to an external magnetic field shown in FIG. 1C can be derived. Therby, a change in electric resistance of the MR device responds linearly to a magnetic signal field generated by a magnetic medium (not shown).

In this magnetoresistive head, a requirement for a fine patterning of the device is caused, with progress of the high density recording by the magnetic medium. As a first approach for attaining a fine patterning of the magnetoresistive head, it can be considered that the MR device should be formed employing a thin film. For example, the soft magnetic layer 3 shown in FIG. 1A can be formed by the thin film. However, if the soft magnetic layer 3 is made thin, uneven coercive force is generated in the thickness direction. In order to improve this drawback, it has-been proposed in Patent Application Publication (KOKAI) 61-241993 that an amorphous insulating film can be used as a base film of the soft magnetic layer 3.

However, according to experiments of the inventors of the present invention, when the soft magnetic layer formed on an amorphous insulating Layer (for instance, $Al_2O_3$) is made thin, there exists a certain thickness where a magnetic moment becomes zero regardless of the soft magnetic layer. Therefore, a linearizing bias cannot serve in the MR device which includes the soft magnetic layer of the certain thickness. Since the certain thickness generating zero magnetic moment is not constant and is varied in a range 20 to 30 Å at the upper limit, for example, it is difficult to adjusts the magnetic moment by controlling the film thickness. In addition, a linearizing magnetic bias field becomes unstable. Ordinarily, the film thickness of the soft magnetic layer is set to be about 200 Å.

The problems associated with the soft magnetic layer are briefly as follows. In case the soft magnetic layer is formed relatively thickly so that the certain thickness generating a zero magnetic moment is negligible, the other drawback described above does not matter especially. But, if the soft magnetic layer is formed thinner than the certain thickness, still another drawback is caused such that a magnetic bias field which is applied to the MR layer is deviated from a designed value.

SUMMARY OF THE INVENTION

An object of the present invention is to provide a magnetoresistive head where a certain thickness of a magnetic layer generating a zero magnetic moment can be made extremely thin and also the magnetic moment of the magnetic layer can be stablized even when the film thickness of the magnetic layer is set to be thin.

According to the present invention, the magnetic layer is formed through a nonmagnetic metal layer on an insulating layer.

In other words, if a nonmagnetic metal layer is employed as a base layer of a magnetic layer, particularly, a soft magnetic layer, which is formed on an insulating layer, an upper limit of a certain film thickness which cause a zero magnetic moment of the magnetic layer can be made small such as several Å. In addition, a deviation of the upper value can be suppressed to a small degree. This fact has been experimentally confirmed.

As a result, by sandwiching a nonmagnetic metal layer between the insulating layer and the magnetic layer, the magnetically stable magnetoresistive head can be obtained, and the device yield can be improved.

DETAILED DESCRIPTION OF THE PREFERRED EMBODIMENTS

There will now be described preferred embodiments of the present invention hereinafter with reference to the accompanying drawings.

Concerning a magnetic moment of a soft magnetic layer, the following experiment has been conducted by the inventors of the present invention.

First, employing a sample where a soft magnetic layer is formed on an insulating layer, a relationship between a film thickness of the soft magnetic layer and its magnetic moment has been derived. An FeNi layer has been utilized as the soft magnetic layer.

Figure 2A:
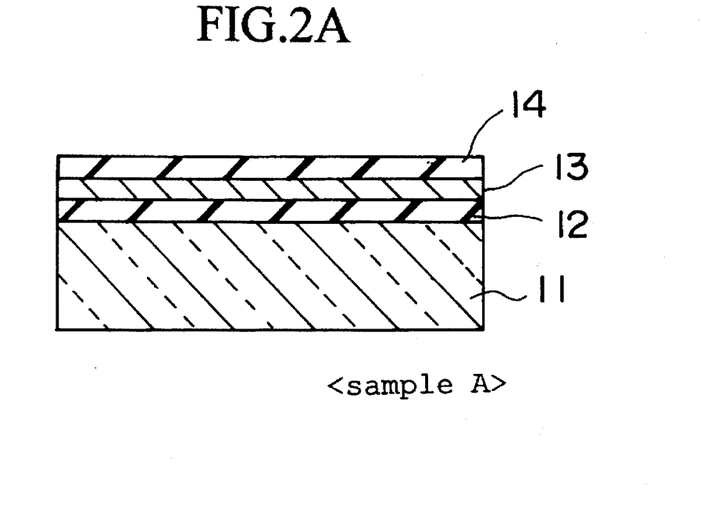
FIG. 2A is a sectional view showing a sample having a structure where a magnetic layer is formed on an insulating layer.

Before performing the experiment, a plurality of samples each having a different film thickness of the FeNi layer have been prepared. These samples have the same configuration except for the film thickness of the FeNi layer. That is, as shown in FIG. 2A, a first insulating layer 12, an FeNi layer 13, and a second insulating layer 14 are formed on a glass substrate 11 in that order. The first insulating layer 12 and the second insulating layer 14 are formed of aluminum oxide ($Al_2O_3$).

Figure 4:
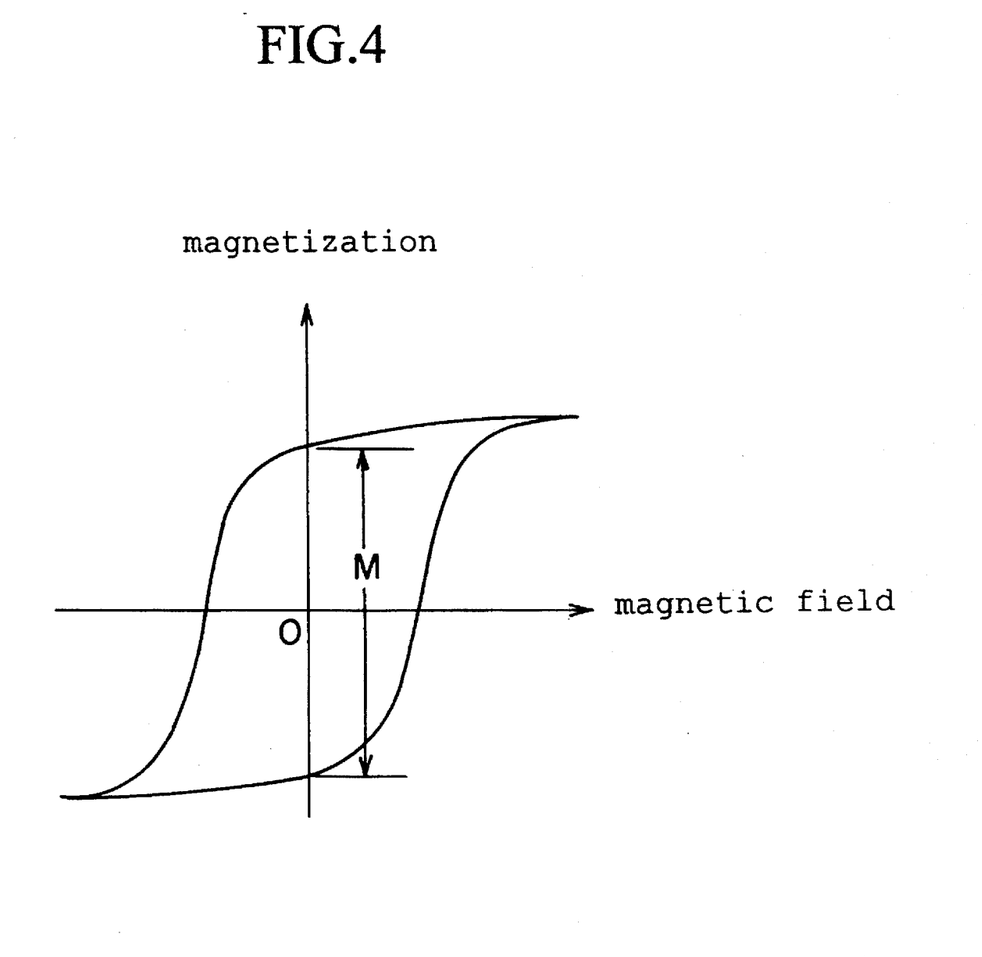
FIG. 4 is a characteristic view showing a relationship between an external magnetic field of the magnetic layer and a magnetic moment.

As to the FeNi layer 13 of the samples A, a magnetic field—magnetization curve shown in FIG. 4 has been measured to thus obtain the magnetic moment M. When a characteristic curve illustrating a relation between the magnetic moment of the FeNi layer 13 of the sample A and a volume of the film is depicted, the result shown in FIG. 2B can be derived. Although an amount of the FeNi layer 13 is actually measured as a volume V, areas occupied by the FeNi layer 13 are identical to each other in the samples A. Therefore, in this case, the film thickness of the FeNi layer 13 is proportional to the volume V.

Figure 2B:
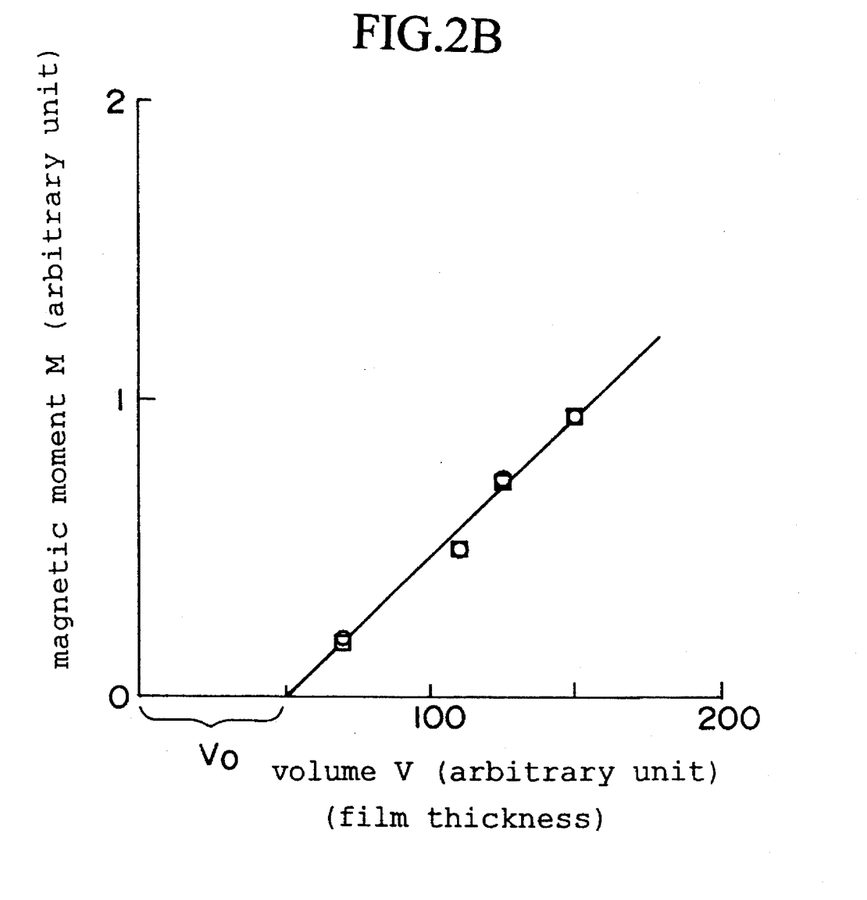
FIG. 2B is a characteristic view showing a relationship between a volume of the magnetic layer in FIG. 2A and a magnetic moment.

According to the measurement result in FIG. 2B, a certain volume Vo (or thickness) which results in a zero magnetic moment M exists, in spite of presence of the FeNi layer 13. In addition, an upper limit of the certain volume (thickness) causing the zero mangenetic moment is not constant, and it deviates in a range about 20 to 30 Å in thickness. Thus, it can be found that it is difficult to control the magnetic moment M only by adjusting the film thickness of the FeNi layer 13 on the first insulating layer 12.

Therefore, the inventors of the present invention have prepared a sample employing a nonmagnetic metal layer instead of the insulating material as a base material of the soft magnetic layer to investigate a relationship between the film thickness and the magnetic moment.

Figure 3A:
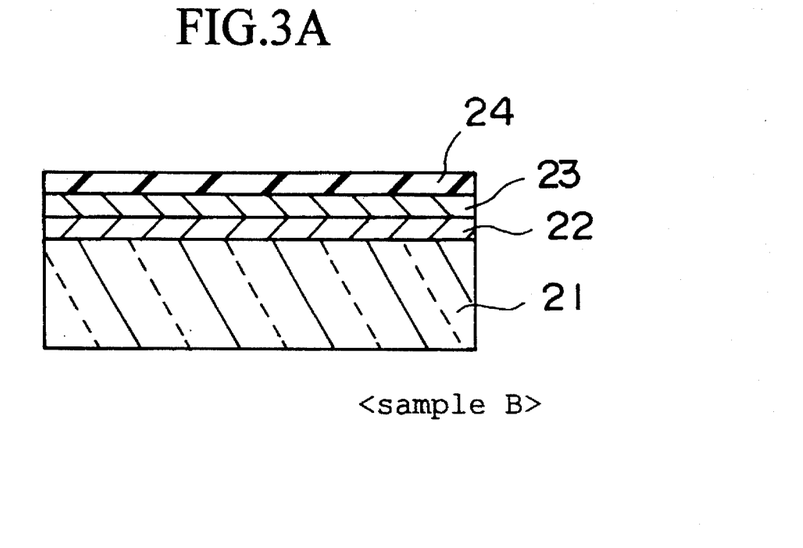
FIG. 3A is a sectional view showing another sample having a structure where a magnetic layer is formed on an insulating layer via a nonmagnetic metal layer.

Before the measurement, a plurality of samples B having different film thickness of the FeNi layer 13 have been prepared as the soft magnetic layer. All the samples B have the same structure except for the film thickness of the FeNi layer 13. As shown in FIG. 3A, the samples B are formed by laminating a tantalum (Ta) layer 22, an FeNi layer 23, and an insulating layer 24 on a glass substrate 11 as an insulating layer in that order. The insulating layer 24 is formed of $Al_2O_3$.

Figure 3B:
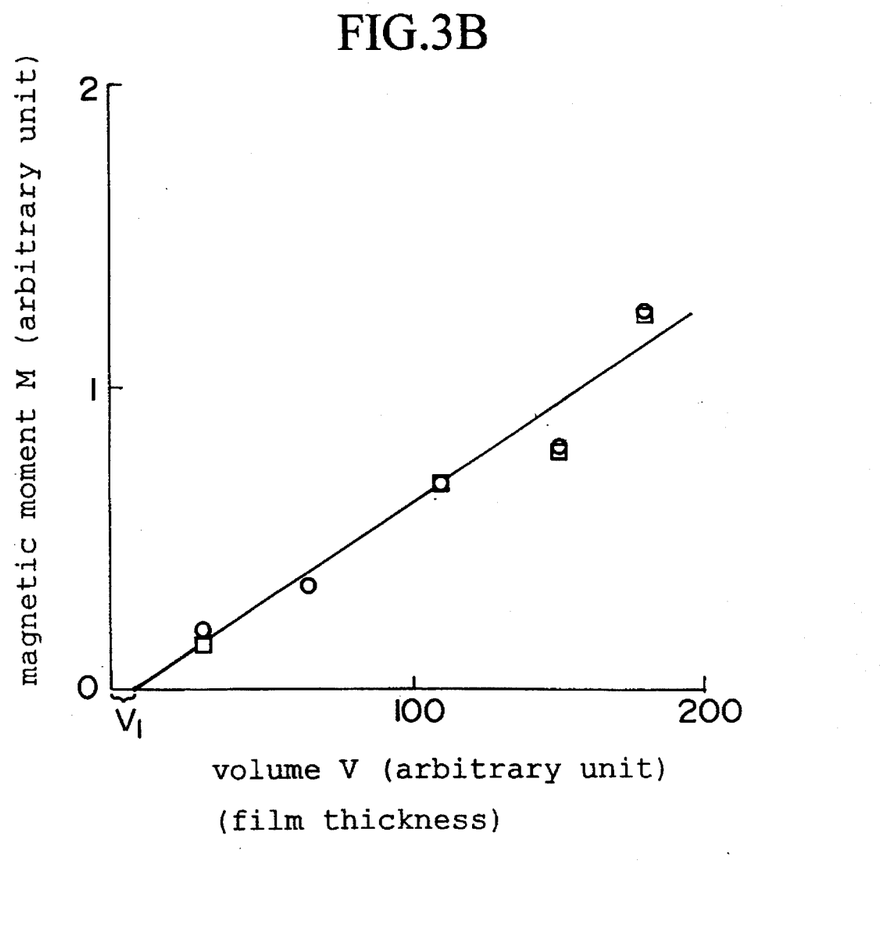
FIG. 3B is a characteristic view showing a relation between a volume of the magnetic layer in FIG. 3A and a magnetic moment.

When the magnetic field-magnetization curves of the FeNi layer 23 of the samples B are measured and thereby a characteristic curve illustrating a relationship between the magnetic moment M of the FeNi layer 23 and the volume V is depicted, a result shown in FIG. 3B can be derived. Also in this case, an amount of the FeNi layer 23 is actually measured as a volume V, areas occupied by the FeNi layer 23 are identical to each other in the samples B. Thus, the film thickness of the FeNi layer 23 is proportional to the volume V.

According to this measurement result, a certain volume V1 (film thickness) of the FeNi layer 23 causing a zero magnetic moment M also can be found. However, if an upper limit of the volume V1 is exchanged into the film thickness, the film thickness is as thin as several Å. Besides, a deviation of the film thickness resulting in the zero magnetic moment becomes very small, so that it can be neglected. Accordingly, even if the film thickness of the FeNi layer 23 is made thin, the magnetic moment thereof becomes stable.

Since the certain film thickness of the FeNi layer 23 which causes the zero magnetic moment does not depend on a film thickness of the Ta layer 22 as the base layer, a film thickness of the Ta layer 22 can be suitably determined, while taking account of a size of the device. For instance, it can be determined as 20 to 30 Å so as to coincide with the film thickness causing the zero magnetic moment when an insulating layer is selected as the base layer of the soft magnetic layer.

The fact discussed above is true of the magnetic material excepting certain FeNi, such as FeNiCr or FeNiRh where chromium (Cr) or rhodium (Rh) is contained into FeNi. Therefore, by selecting the nonmagnetic metal layer as the base layer of the magnetic layer and adjusting the film thickness of the magnetic layer, it becomes possible to control the magnetic moment with high accuracy. As the nonmagnetic metal material for the base layer of the magnetic layer, any of titanium (Ti), zirconium (Zr), hafnium (Hf), vanadium (V), niobium (Nb), chromium (Cr), molybdenum (Mo), tungsten (W) and their alloys can be employed in addition to tantalum (Ta).

A structure obtained by forming the nonmagnetic metal layer and the magnetic layer on the insulating layer in that order, as described above, can be employed in the MR head, for example. In this case, the magnetic layer 34 is used as the soft adjacent layer (SAL) for applying the magnetic bias field to the MR layer 36, such as shown in FIGS. 5A through 5G. Then, an MR head having such structure will be explained.

FIGS. 5A to 5D and FIGS. 6A to 6C are sectional views each showing manufacturing steps of the MR head according to the embodiment of the present invention.

Figure 5A:
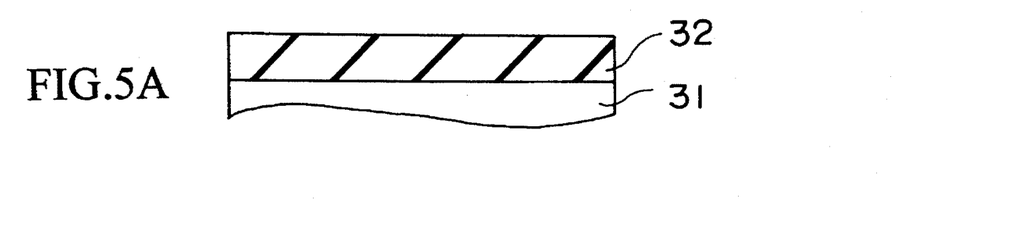
FIGS. 5A to 5G are sectional views each showing manufacturing steps of an MR device according to an embodiment of the present invention.

First, as shown in FIG. 5A, using a substrate 31 made of a material having a magnetic shield effect such as a ferrite material, a first insulating layer 32 made of aluminum oxide ($Al_2O_3$), silicon oxide ($SiO_2$) or the like is formed on the substrate 31 to have a thickness of about 1000 Å.

Figure 5B:
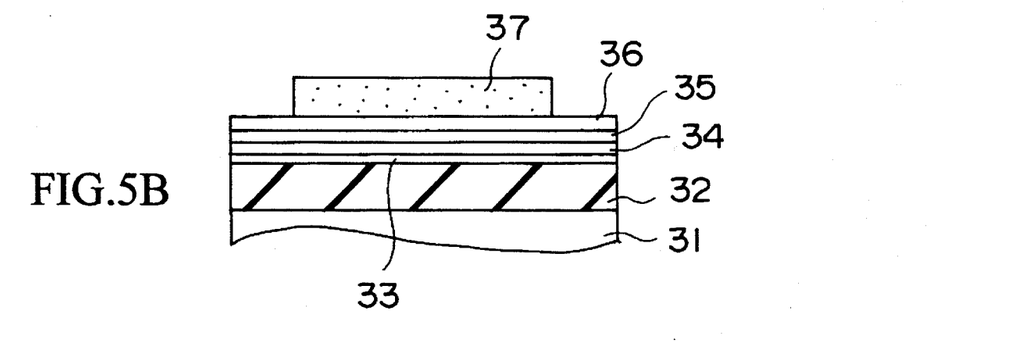

Next, as shown in FIG. 5B, a nonmagnetic metal layer 33 of Ta, W etc., a soft magnetic layer 34 of FeNiCr, a high resistance nonmagnetic metal layer 35 of Ta, and an MR layer 36 of FeNi are formed on the first insulating layer 32 by sputtering in that order. The film thicknesses of the nonmagnetic metal layer 35 and the MR layer 36 are set to 100 Å and 200 Å, respectively. In addition, magnetization is set to 0.7 T by setting the film thickness of the soft magnetic layer 34 on the nonmagnetic metal layer 33 to 200 A. Since a distance between upper and lower magnetic shields becomes narrow as a recording density of the magnetic medium is increased, the film thickness of the nonmagnetic metal layer 33 is needed not to be formed too thick. It is not preferable to form the nonmagnetic metal layer 33 having a thickness of more than 200 Å.

Next, the first resist 37 applied on the MR layer 36 is exposed and then developed, so that it is left on only a rectangular element forming area of 3×150 $\mu m^2$.

Figure 5C:
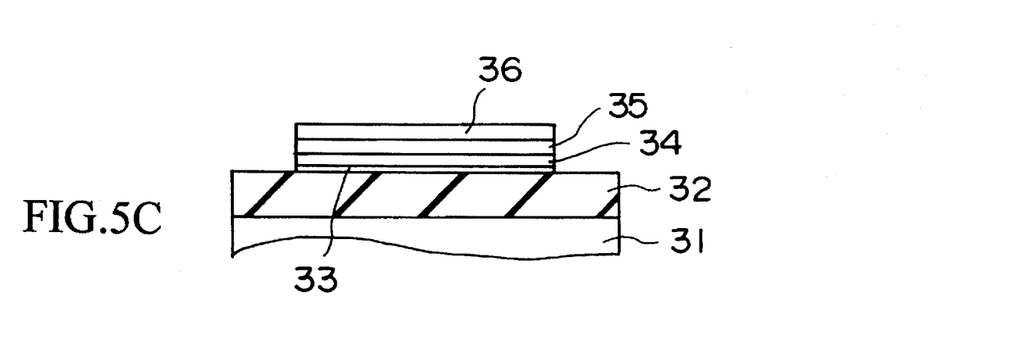

Subsequently, as shown in FIG. 5C, using the first patterned resist 37 (shown in FIG. 5B) as a mask, the MR layer 36, the nonmagnetic metal layer 35, the soft magnetic layer 34 and the nonmagnetic metal layer 33 are etched. These layers are left only in the device forming area, and they have their rectangular planar shape. After completing the patterning of the layers, the first resist 37 (shown in FIG. 5B) is removed, resulting in the structure shown in FIG. 5C.

Figure 5D:
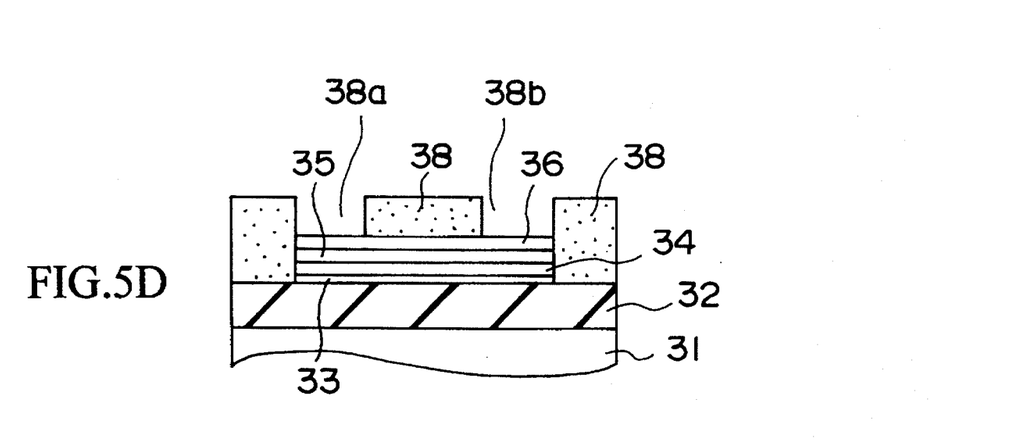

Next, referring to FIG. 5D, the second resist 38 is applied on an entire surface. By exposing and then developing the second resist 38, two windows 38a, 38b are formed in electric connecting areas on both ends of the rectangular MR layer 36 in the longitudinal direction thereof.

Figure 5E:
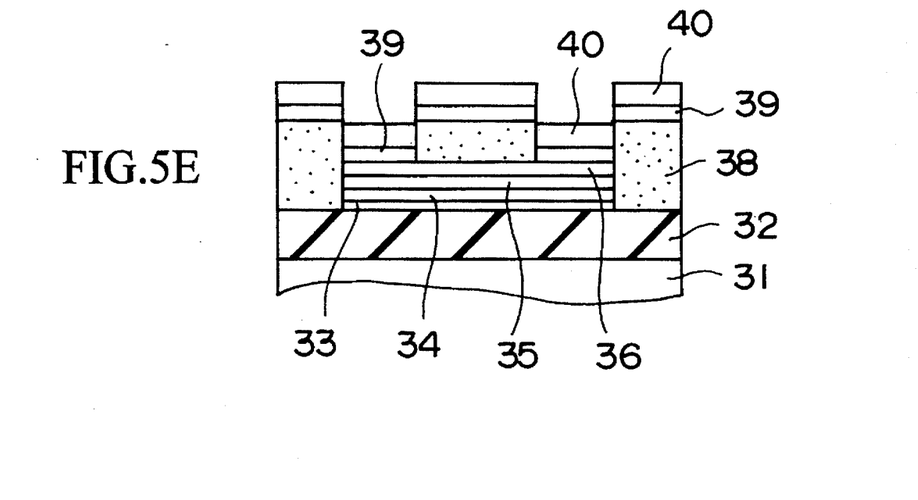
Figure 5F:
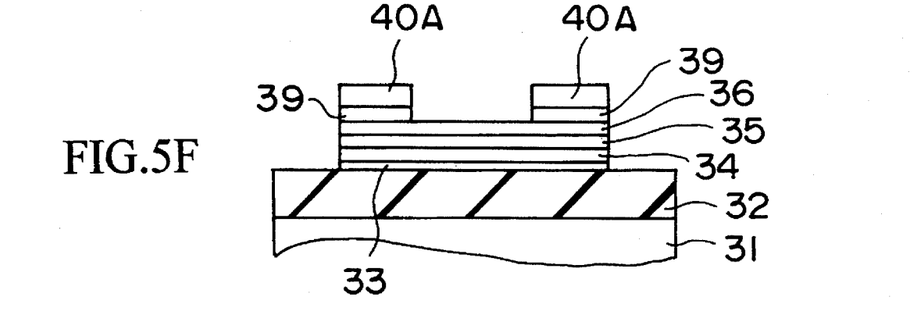

Thereafter, referring now to FIG. 5E, a Barkhausen suppressing layer 39 made of a antiferromagnetic material such as the FeMn and a gold (Au) layer 40 are formed on both the second resist 38 and the MR layer 36 exposed from the windows 38a, 38b to have thicknesses of 200 Å and 2000 Å, respectively. When the second resist 38 is in turn removed as shown in FIG. 5F, the Barkhausen suppressing layer 39 and the gold (Au) layer 40 are left only in the electric connecting area. As a result, Au layers 40 left on both ends of the MR layer 36 can be employed as a pair of connecting conductive layers 40A, 40B.

Figure 5G:
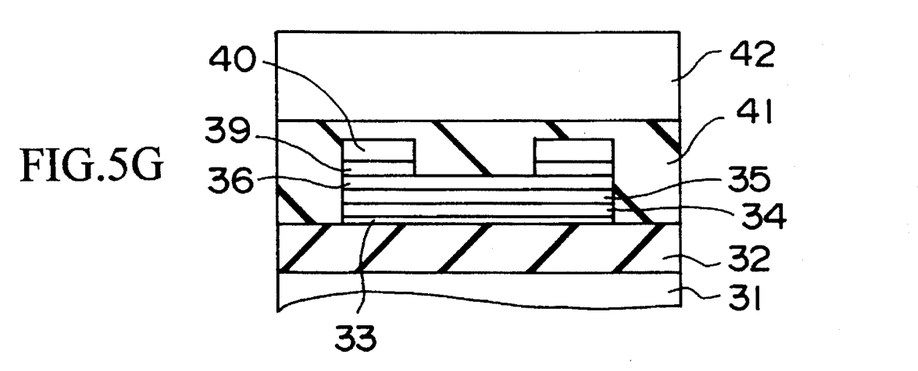

Subsequently, referring to FIGS. 5F and 5G, the connecting conductive layers 40A, 40B and the MR layer 36 are covered with the second insulating layer 41 such as $Al_2O_3$, $SiO_2$ etc.. Then, a magnetic shield layer 42 such as iron-nickel is formed on the second insulating layer 41. Thereby, the MR head is completed.

Besides, at the time of forming the MR layer 36 and the Barkhausen suppressing layer 39, they are formed on the condition that the magnetic field is applied in the longitudinal direction of the MR layer so as to magnetize a sense region thereof in the direction from the connecting conductor lead 40A to the other connecting conductor lead 40B. Moreover, the thickness of the first insulating film 32 in a lower part than the MR element serves as a lower gap for reading, and the thickness of the second insulating film 41 in an upper part serves as an upper gap.

In the above embodiment, any materials described above can be used as the nonmagnetic metal layer 33. The NiFeRh can be used in addition to the FeNiCr as one of materials for the soft magnetic layer 34.

According to the above steps, the magnetic moment can be easily controlled by adjusting only its film thickness even if the soft magnetic layer is formed thin. In addition, a stable linearizing bias field can be applied to the MR layer. As a result, a magnetic head, in which reliability and device yield is improved, can be formed.

As described above, when the nonmagnetic metal layer was used as a base layer of the magnetic layer to be formed on the insulating layer, an upper limit of the thickness in which magnetic moment equals zero became as thin as several Å, and also its deviation was supressed.

Accordingly, due to the present invention, since the nonmagnetic metal layer is put between the insulating layer and magnetic layer, a magnetically stable magnetoresistive head can be obtained and a device yield can be improved.

Figure 6A:
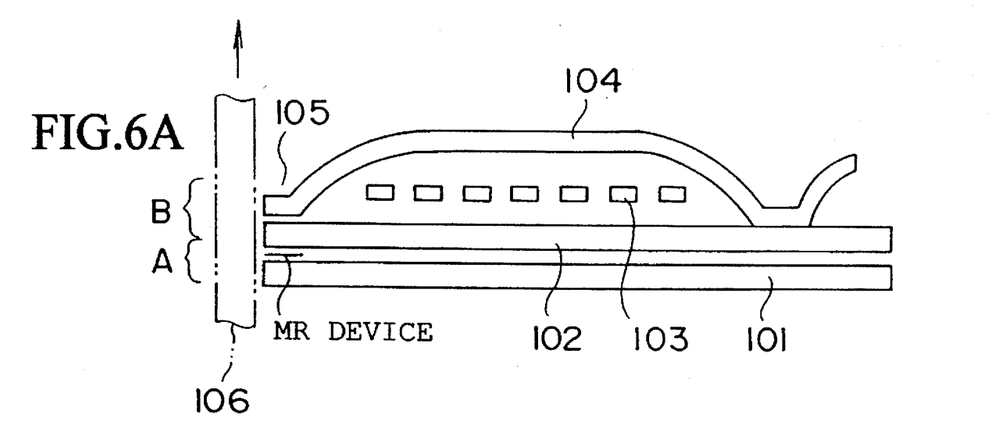
FIG. 6A is a sectional view showing a magnetic recording apparatus of common use type into which the MR device according to the embodiment of the present invention is incorporated.
Figure 6B:
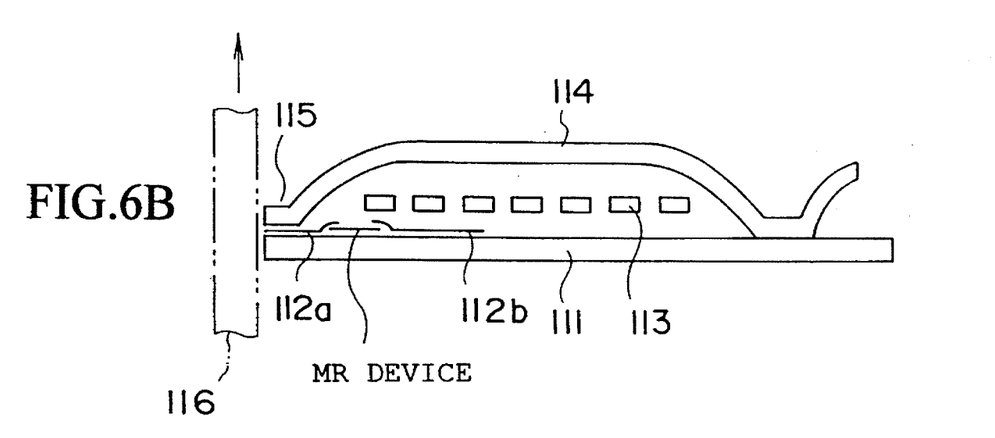
FIG. 6B is a side view showing a magnetic recording apparatus of in-gap type having a flux guide, into which the MR device according to the embodiment of the present invention is incorporated.
Figure 6C:
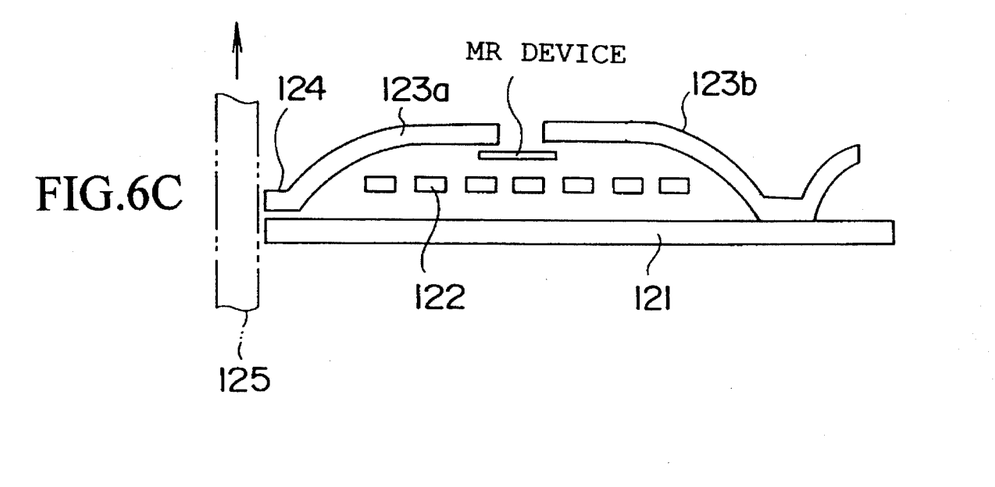
FIG. 6C is a side view showing a magnetic recording apparatus of yoke type into which the MR device according to the embodiment of the present invention is incorporated.

Next, with reference to FIGS. 6A to 6C, a magnetic recording apparatus according to the embodiment of the present invention into which the MR device described above is incorporated will be explained. FIGS. 6A to 6C are sectional views showing a magnetic head portion of the magnetic recording apparatus.

FIG. 6A shows a composite type MR head. An A portion denotes a reproducing head, and a B portion denotes a recording head. A soft magnetic layer 102 is commonly used as a magnetic shield of the reproducing head and a magnetic pole of the recording head.

As shown in FIG. 6A, in the reproducing head portion, soft magnetic layers 101, 102 used as the magnetic shield are positioned to oppose to each other at a distance. The MR device described above is put into a gap of a portion 105 facing towards a magnetic recording medium 106. A leakage magnetic field generated from the magnetic recording medium 106 can be directly detected.

In the reproducing head portion, soft magnetic layers 102, 104 used as the magnetic pole are positioned to oppose to each other at a distance. A coil 103 is formed in a gap of the soft magnetic layers 102, 104 and generates a magnetic flux which passes through the soft magnetic layers 102, 104. By generating the leakage magnetic field from the gap of the facing portion 105 by this magnetic flux, the magnetic recording medium 106 can record various information.

FIG. 6B shows an in-gap type MR head. As shown in FIG. 6B, soft magnetic layers 111, 114 used as the magnetic pole are positioned to oppose to each other at a distance. The MR device described above is put into a gap of a portion 115 facing towards a magnetic recording medium 116. A coil 113 is formed in a gap of the soft magnetic layers 111, 114 and generates a magnetic flux passing through the soft magnetic layers 111, 114.

In order to avoid corrosion or direct contact to with the magnetic recording medium, the MR device is positioned inside of the magnetic head, without protruding into the portion 115 facing towards the magnetic recording medium 116. A flux guide 112a, which is electrically isolated from the MR device and magnetically coupled thereto, is protruded towards the facing portion 115. The leakage magnetic field generated by the magnetic recording medium 116 is entered into the flux guide 112a and then detected by the MR device. At the other end of the MR device, another flux guide 112b, which is electrically isolated from the MR device and magnetically coupled thereto, is formed to guide the magnetic flux from the MR device to the soft magnetic layers 111, 114.

FIG. 6C shows a yoke type MR head. As shown in FIG. 6C, soft magnetic layers 121, 123a and 123b are used as the magnetic pole and are positioned to oppose to each other at a distance. A coil 122 is formed in a gap of the soft magnetic layers 121, 123a and 123b and generates a magnetic flux which passes through the soft magnetic layers 121, 123a and 123b. The MR device is positioned at an end of the soft magnetic layers 123a and 123b such that it is electrically isolated from the soft magnetic layers 123a and 123b and magnetically coupled thereto. The leakage magnetic field is generated from the gap of the facing portion 124 by the magnetic flux which is generated by the coil 122 and passes through the soft magnetic layers 121, 123a and 123b, so that the magnetic recording medium 125 can record various information.

In the magnetic recording apparatus shown in FIGS. 6A to 6C, a substrate on which the magnetic head is formed and insulating films between the soft magnetic layers etc. are omitted.

The MR device according to the embodiment described above are in the above magnetic recording apparatus, which allows a magnetically stable magnetic recording device to be obtained, and the device yield can be improved.

Note that the MR device according to the present invention may be used in various magnetic recording apparatus as well as the above magnetic recording apparatus.

Moreover, the MR device may be used in a reproducing-only magnetic recording apparatus.

What is claimed is:

1. A magnetoresistive head comprising:
   a substrate having a magnetic shield effect;
   an insulating layer formed on said substrate;
   a first nonmagnetic metal layer formed on said insulating layer;
   a soft magnetic layer formed on said first nonmagnetic metal layer;
   a second nonmagnetic metal layer formed on said soft magnetic layer;
   a magnetoresistive layer formed on said second nonmagnetic metal layer;
   an antiferromagnetic layer formed on said magnetoresistive layer, said antiferromagnetic layer being divided into a first portion and a second portion;
   a first electrode formed on said first portion of said antiferromagnetic layer; and
   a second electrode formed on said second portion of said antiferromagnetic layer.

2. The magnetoresistive head according to claim 1, wherein said first nonmagnetic layer is made of one of tantalum, titanium, zirconium, hafnium, vanadium, niobium, chromium, molybdenum and tungsten, or an alloy containing one of these elements.

3. The magnetoresistive head according to claim 2, wherein said soft magnetic layer is made of one of FeNiCr and NiFeRh.

4. The magnetoresistive head according to claim 2, wherein said magnetoresistive layer is made of a FeNi alloy.

5. The magnetoresistive head according to claim 2, wherein said second nonmagnetic metal layer is made of one of tantalum, titanium, zirconium, hafnium, vanadium, niobium, chromium, molybdenum and tungsten, or an alloy containing one of these elements.

6. method of fabricating a magnetoresistive head comprising the steps of:
   forming a first insulating layer on a substrate having a magnetic shield effect;
   forming a first nonmagnetic metal layer on said first insulating layer;
   forming a soft magnetic layer on said first nonmagnetic metal layer;
   forming a second nonmagnetic metal layer on said soft magnetic layer;
   forming a magnetoresistive layer on said second nonmagnetic metal layer;
   forming a photoresist layer on said magnetoresistive layer;
   patterning said photoresist layer to form first and second windows;
   depositing an antiferromagnetic material and then depositing an electrode material on said first and second windows to form, respectively, a first antiferromagnetic layer and a first electrode in said first window and a second antiferromagnetic layer and a second electrode in said second window;
   peeling off said photoresist layer to create an exposed portion of said magnetoresistive layer;
   forming a second insulating layer to cover said exposed portion of said magnetoresistive layer, said first and second antiferromagnetic layers and said first and second electrodes; and
   forming a magnetic shield layer on said second insulating layer.

7. The method according to claim 6, wherein said nonmagnetic metal layer is chosen from the group consisting of tantalum, titanium, zirconium, hafnium, vanadium, niobium, chromium, molybdenum and tungsten, or an alloy containing one of these elements.

8. A magnetic recording/reproducing apparatus comprising:
   a magnetoresistive head including:
      a substrate having a magnetic shield effect;
      an insulating layer formed on said substrate;
      a first nonmagnetic metal layer formed on said insulating layer;
      a soft magnetic layer formed on said first nonmagnetic metal layer;
      a second nonmagnetic metal layer formed on said soft magnetic layer;
      a magnetoresistive layer formed on said second nonmagnetic metal layer;
      an antiferromagnetic layer formed on said magnetoresistive layer, said antiferromagnetic layer being divided into a first portion and a second portion;
      a first electrode formed on said first portion of said antiferromagnetic layer;
      a second electrode formed on said second portion of said antiferromagnetic layer; and
   a magnetic recording medium for recording magnetic information read out by said magnetoresistive head.

* * * * *

UNITED STATES PATENT AND TRADEMARK OFFICE
CERTIFICATE OF CORRECTION

PATENT NO. : 5,621,593
DATED : April 15, 1997
INVENTOR(S) : Kitajima

It is certified that error appears in the above-indentified patent and that said Letters Patent is hereby corrected as shown below:

Under "[57] Abstract", line 1, after "relates" insert --to--.

Column 1, line 12, delete "apparatus empolying a" and insert --apparatus employing a-- therefor.

Column 1, line 61, delete "Therby, a change" and insert --Thereby, a change-- therefor.

Column 2, line 7, delete "it has-been proposed" and insert --it has been proposed-- therefor.

Column 2, line 20, delete "to adjusts the" and insert --to adjust the-- therefor.

UNITED STATES PATENT AND TRADEMARK OFFICE
CERTIFICATE OF CORRECTION

PATENT NO. : 5,621,593
DATED : April 15, 1997
INVENTOR(S) : Kitajima

It is certified that error appears in the above-indentified patent and that said Letters Patent is hereby corrected as shown below:

Column 2, line 51, delete "which cause a" and insert --which causes a-- therefor.

Column 4, line 8, delete "zero manganetic moment" and insert --zero magnetic moment-- therefor.

Column 6, line 11, delete "of materials" and insert --of the materials-- therefor.

Column 6, line 42, delete "oppose to each" and insert --oppose each-- therefor.

Column 6, line 48, delete "oppose to each" and insert --oppose each-- therefor.

UNITED STATES PATENT AND TRADEMARK OFFICE
CERTIFICATE OF CORRECTION

PATENT NO. : 5,621,593
DATED : April 15, 1997
INVENTOR(S) : Kitajima

It is certified that error appears in the above-indentified patent and that said Letters Patent is hereby corrected as shown below:

Column 6, line 58, delete "oppose to each" and insert --oppose each-- therefor.

Column 6, line 64, delete "contact to with" and insert --contact with-- therefor.

UNITED STATES PATENT AND TRADEMARK OFFICE
CERTIFICATE OF CORRECTION

PATENT NO. : 5,621,593
DATED : April 15, 1997
INVENTOR(S) : Kitajima

Page 4 of 4

It is certified that error appears in the above-identified patent and that said Letters Patent is hereby corrected as shown below:

Column 7, line 12, delete "oppose to each" and insert --oppose each-- therefor.

Column 7, line 30, after "are" insert --used--.

Column 8, line 6, delete "method of" and insert --A method of-- therefor.

Signed and Sealed this

Eighth Day of September, 1998

Attest:

BRUCE LEHMAN

Attesting Officer

Commissioner of Patents and Trademarks